United States Patent [19]

Hunter

[11] 4,382,556

[45] May 10, 1983

[54] SIDE WHEEL ROLL LEVELING DEVICE

[75] Inventor: Edwin J. Hunter, Rancho Santa Fe, Calif.

[73] Assignee: The Toro Company, Minneapolis, Minn.

[21] Appl. No.: 149,894

[22] Filed: May 15, 1980

[51] Int. Cl.$^3$ .............................................. B05B 15/08
[52] U.S. Cl. ..................................... 239/715; 188/67; 188/71.1; 239/587; 285/5
[58] Field of Search ....................... 239/715, 587, 177; 285/5, 95, 113; 188/67, 71.1, 72.4; 192/4 R

[56] References Cited

U.S. PATENT DOCUMENTS

| | | | |
|---|---|---|---|
| 3,002,697 | 10/1961 | Jones | 239/715 |
| 3,045,922 | 7/1962 | Jensen | 239/715 |
| 3,143,298 | 8/1964 | Jones | 239/715 |
| 3,226,137 | 12/1965 | Trnka | 285/113 |
| 3,669,362 | 6/1972 | Meyerhofer | 239/587 |
| 4,040,651 | 8/1977 | La Branche | 285/113 |

Primary Examiner—Robert B. Reeves
Assistant Examiner—Michael J. Forman
Attorney, Agent, or Firm—James W. Miller

[57] ABSTRACT

A fluid pressure activated mechanism in a rollable side wheel irrigating device allows gravity to maintain the sprinkler head portion of the device perpendicular or level to the ground as the device is rolled in position, and prevents nozzle pressure from moving the sprinkler head once fluid has entered the irrigation device after it has been positioned. The side wheel irrigating device includes an irrigation conduit within a horizontally-disposed axle member attached to two wheels. The conduit extends through the axle at its mid-point and routes irrigating fluid to a gravity-biased sprinkler conduit supporting a sprinkler head. The mechanism is attached between the two conduits, with the mechanism being rigidly attached to the irrigation conduit. The sprinkler conduit is attached to an annular hub and allowed rotative and translative movement in the mechanism housing. Prior to fluid of sufficient pressure entering the mechanism housing, the sprinkler conduit is free to rotate under the force of gravity. As fluid enters the housing, a pressure differential is created across the annular hub as the fluid pressure on the housing inlet side of the hub increases relative to the atmospheric pressure on the housing outlet side of the hub. The pressure differential thereafter causes the axial translation of the hub until a sharp ridge of the hub frictionally engages a rubber washer. The frictional engagement prevents rotation of the sprinkler conduit, and thus of the sprinkler head, as long as the flow of irrigation fluid continues.

13 Claims, 9 Drawing Figures

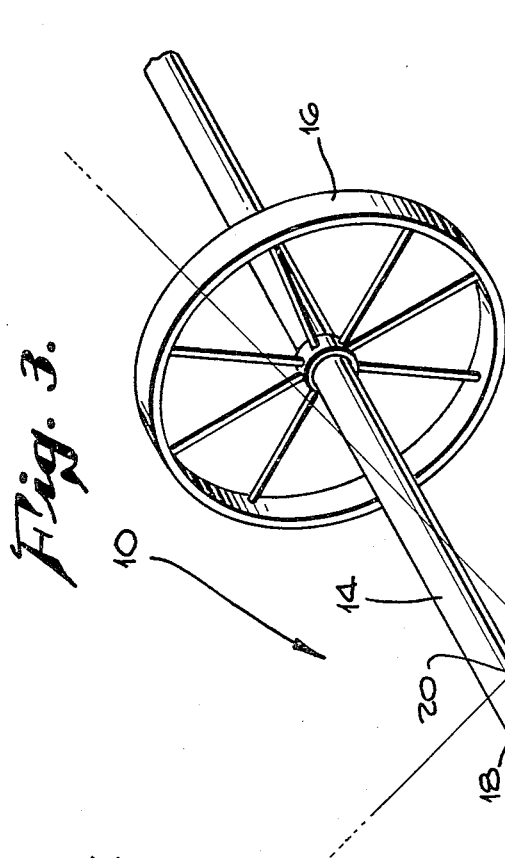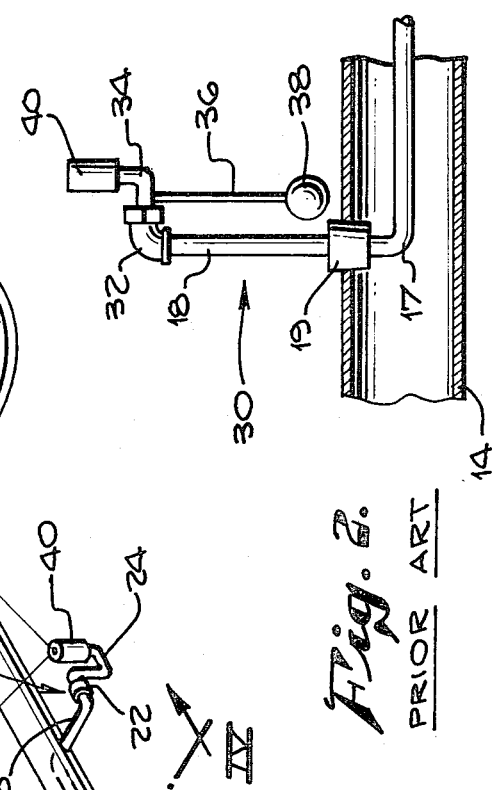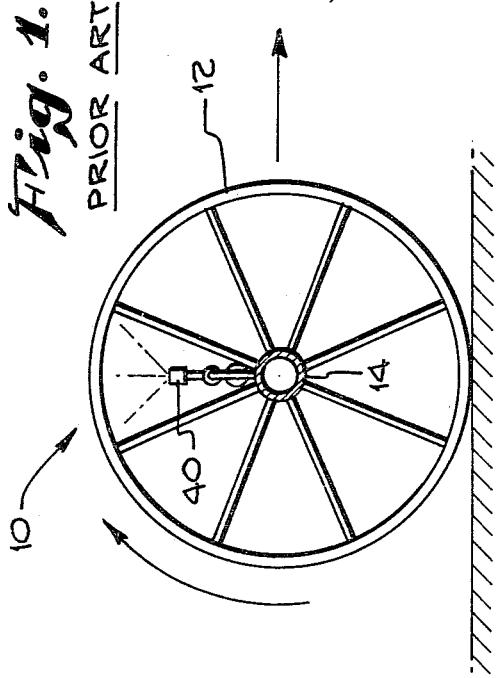

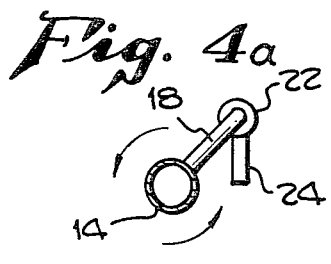
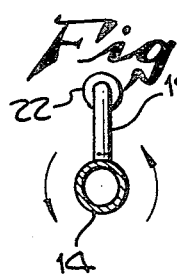
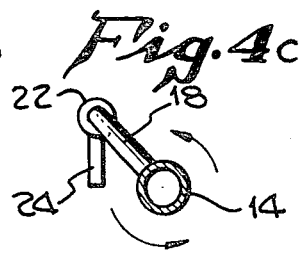
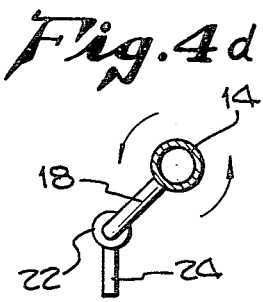
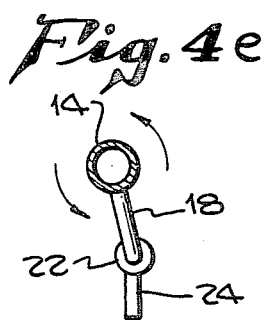
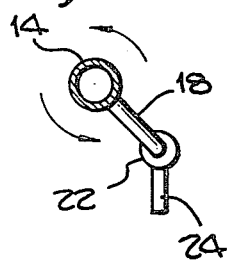
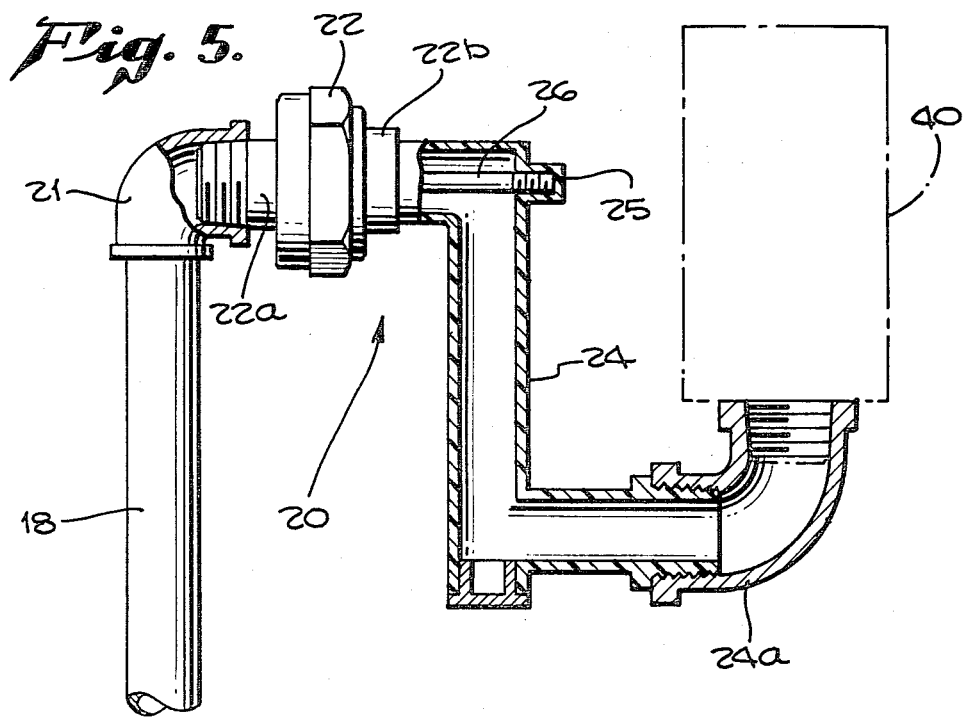

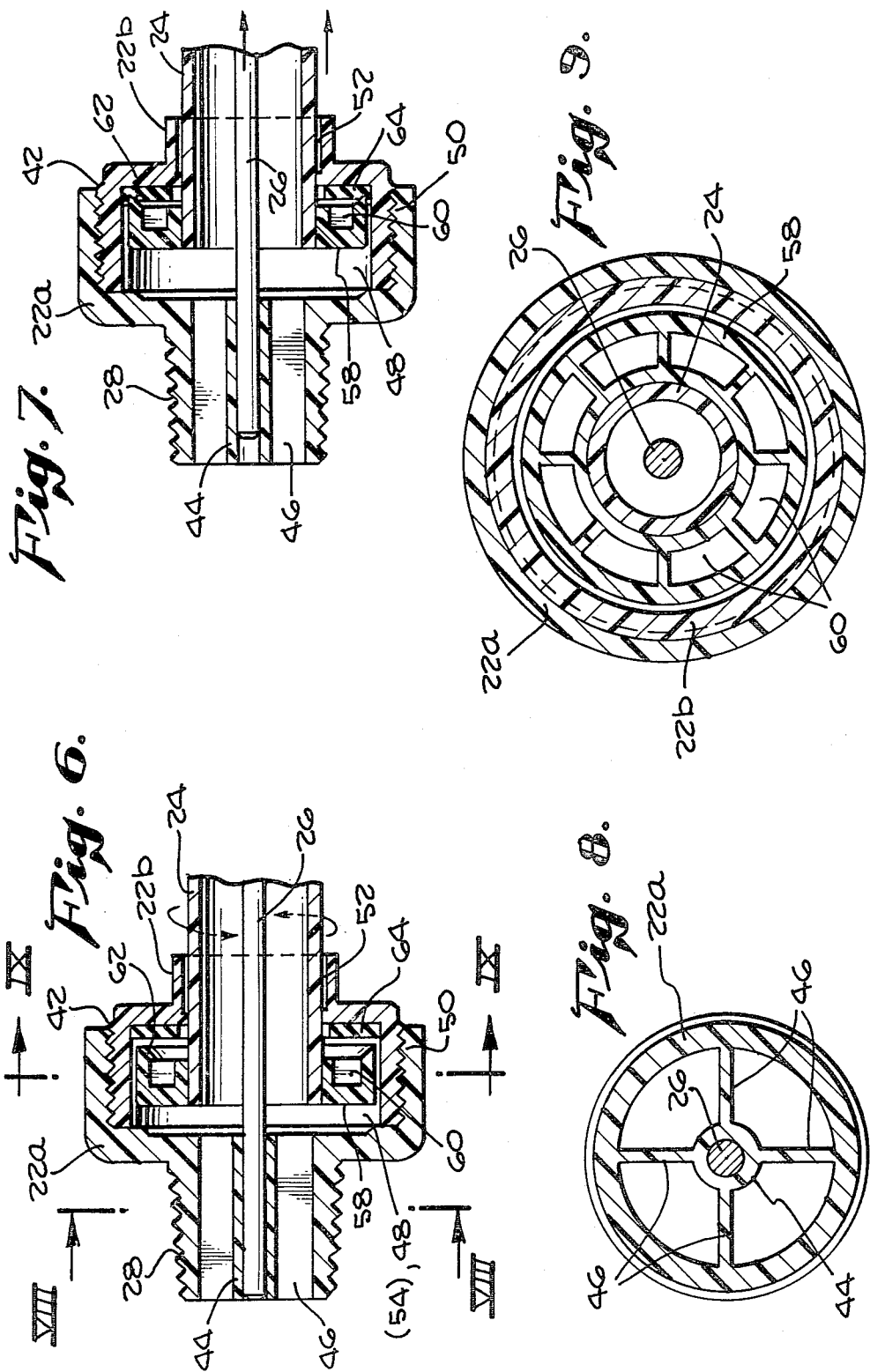

SIDE WHEEL ROLL LEVELING DEVICE

FIELD OF THE INVENTION

The present invention, in general, relates to rotatable couplings incorporating braking mechanisms, and, in particular, to irrigating devices incorporating such couplings for the postioning of sprinkler heads.

BACKGROUND OF THE INVENTION

Rollable side wheel irrigating devices are widely used in irrigation applications where below-ground irrigating systems are not available or have not been installed, and also in applications where economy is an important consideration. Such devices typically utilize a horizontally-disposed axle attached at each end to a wheel or similar rollable support. Through the axle passes an irrigation conduit connected to a source of fluid. The conduit usually exits perpendicularly from the axle at its midpoint and projects outwardly therefrom. To the projection is rotatably connected, via a coupling, a gravity-biased sprinkler head conduit supporting a sprinkler head. The gravity bias is provided by means of a heavy mass rigidly suspended from the sprinkler conduit. Accordingly, as the side wheel irrigating device is rolled to various locations requiring irrigation, the heavy mass attached to the sprinkler conduit causes it to rotate and to thereby maintain the sprinkler head in a level or perpendicular relation to the ground. As a result, no separate positioning of the sprinkler head is required.

While the arrangement of the sprinkler conduit and the suspended mass rotatably connected to the portion of the irrigation conduit projecting from the axle is effective in maintaining a perpendicular relationship of sprinkler head to the ground, it also has several disadvantages. Primary among these is the fact that the various components in the irrigating device which maintain the sprinkler head perpendicular to the ground, such as the rotatable coupling, the sprinkler conduit connected between the coupling and the sprinkler head, and the mass or counterweight attached to the sprinkler conduit, must be made of heavy materials such as metal. Such materials are, therefore, more expensive than they otherwise need be if alternate materials could be used in the construction of the device. Furthermore, because metal components are utilized, are subject to corrosion and thus need periodic replacement.

Additionally, a basic disadvantage with the design described above is the necessity for utilizing a counterweight to maintain the sprinkler head in a level or perpendicular relationship with the ground. It would be desirable to eliminate this counterweight, and therefore to simplify the design.

Accordingly, it is the principal object of the present invention to simplify the design of that portion of a rollable side wheel irrigating device that maintains a sprinkler head attached to the device in a perpendicular relationship with the ground.

It is another object of the this invention to eliminate the counterweight currently used to level the sprinkler head.

It is still another object of the present invention to utilize corrosion-resistant, inexpensive, and lightweight materials in that portion of a rollable side wheel irrigating device which maintains the sprinkler head portion of the device in a perpendicular relationship with the ground.

SUMMARY OF THE INVENTION

The present invention, in a broad aspect, provides an improved rollable side wheel irrigating device wherein the previously-used counterweight, rotatable coupling, and sprinkler conduit are replaced by a fluid pressure-activated mechanism connected to the portion of the irrigating conduit extending from the axle and by a special sprinkler conduit connected between the mechanism and the sprinkler head. The sprinkler conduit is again gravity-biased and is permitted to rotate by the pressure-activated mechanism as the irrigating device is positioned prior to the passage of irrigating fluid into it. However, the mechanism prevents such rotative movement of the sprinkler conduit when irrigating fluid of sufficient pressure enters the mechanism after the positioning has been completed.

In accordance with one feature of the invention, the fluid pressure-activated mechanism includes a housing having a fluid inlet rigidly affixed to the projection of the irrigating conduit from the axle portion of the irrigating device and a fluid outlet sealingly communicating with one end of the sprinkler conduit. A shaft attached to the sprinkler conduit connects the conduit to the housing in a manner allowing the sprinkler conduit to have rotative and axial movement within the outlet. A braking assembly within the housing allows irrigating fluid of sufficient pressure to axially translate the end of the sprinkler conduit into abutting, non-rotating relation with the housing, but allows the sprinkler conduit to rotate when the fluid is below this level of pressure. Accordingly, as the irrigating device is rolled into position prior to entry of the irrigating fluid into the housing, the gravity bias on the sprinkler conduit maintains the sprinkler head in a level or perpendicular orientation relative to the ground. Upon application of the irrigating fluid the axial translation of the end of the sprinkler conduit into an abutting, non-rotating relation with the housing maintains the sprinkler head in the level or perpendicular orientation and thereby counteracts the thrust upon the mechanism created by the passage of irrigating fluid through the sprinkler head nozzle.

In accordance with still another feature of the invention, the braking assembly utilizes a rubber washer affixed within the housing adjacent to the outlet, and circumscribing the end of the sprinkler conduit within the housing, to prevent fluid loss between the housing and the sprinkler conduit. Attached to the end of the sprinkler conduit within the housing is an annular hub which has a raised ridge disposed toward the washer. The hub is positioned in the path of the irrigating fluid passing through the mechanism. In this manner, until irrigating fluid of sufficient pressure enters the housing, the annular hub is positioned away from the washer and thus allows gravity to rotate the sprinkler conduit and sprinkler head relative to the housing. When the fluid pressure on the inlet side of the annular hub is greater than the atmospheric pressure on the outlet side of the hub, the sprinkler conduit axially translates until the ridge on the hub frictionally engages the washer, which stops further axial translation of the sprinkler conduit and which also prevents the previously-allowed rotative movement of the sprinkler conduit, thereby maintaining the sprinkler head perpendicular to the ground.

In accordance with another feature of the invention, the shaft connecting the sprinkler conduit to the housing has one end rigidly attached to the conduit and the other end supported by a low friction-material bearing sleeve within the housing, thereby obviating the need for the outer wall of the conduit to act as a bearing surface.

In accordance with a further feature of the invention, the sprinkler conduit is U-shaped, thereby allowing the force of the gravity to maintain the sprinkler head in a perpendicular relation to the ground as the irrigating device is rolled into position.

In accordance with a final feature of the invention, the simplified design of the fluid pressure activated mechanism and sprinkler conduit allow them to be constructed of lightweight, corrosion-resistant, inexpensive plastic components.

Other objects, features, and advantages of the present invention will become apparent from the consideration of the following detailed description and from the accompanying drawings.

BRIEF DESCRIPTION OF THE DRAWINGS

FIG. 1 shows a side view of a prior art version of a rollable side wheel irrigating device;

FIG. 2 is a detail view of FIG. 1, showing components thereof which maintain a sprinkler head perpendicular to the ground;

FIG. 3 is a perspective view of an improved rollable side wheel irrigating device according to the present invention;

FIG. 4 is a diagrammatic view of the improved side wheel irrigating device of FIG. 3, taken through the plane IV—IV, and showing the operation thereof;

FIG. 5 is a cross-sectional view of the improved sprinkler head leveling mechanism of the present invention;

FIG. 6 is a detail cross-sectional view of a portion of FIG. 5;

FIG. 7 shows the components of FIG. 6 in an alternate position;

FIG. 8 is an end view of FIG. 6, taken through the plane VIII—VIII; and

FIG. 9 is an end view of FIG. 6, taken through the plane IX—IX.

DETAILED DESCRIPTION

Referring more particularly to the drawings, FIGS. 1 and 2 (in conjunction with FIG. 3), show a prior art version of the present invention. As shown in FIG. 1, a rollable side wheel irrigating device, generally denoted 10, includes a horizontally-disposed axle member 14 connected to two circular supports 12 and 16. Within the axle member 14 is an irrigation conduit 17 connected to a source of irrigating fluid such as water. The irrigation conduit, as shown in FIG. 3, extends approximately to the middle portion of the axle 14. At this point, the irrigation conduit 17 passes through the sidewall of the axle to the exterior by means of a coupling 19 and a short extension conduit 18.

The extension irrigation conduit 18 is disposed perpendicularly to the axle and terminates in an elbow member 32. Also connected to the elbow member 32 is a sprinkler conduit 34. The elbow 32 is adapted to allow rotation of the sprinkler conduit therein, and yet sealingly engage the conduit 34.

To the sprinkler conduit 34 is connected a sprinkler head 40, a counterweight support rod 36, and a heavy counterweight or mass 38. The mass 38 allows gravity to bias the sprinkler conduit 34 to position the sprinkler head perpendicular to the ground. As can be easily visualized, the operation of the prior art version of device simply entails rolling it into position and turning on the irrigating fluid. The counterweight 38 maintains the sprinkler head 40 in a level or perpendicular position relative to the ground both prior to and during the passage of irrigating fluid through the device 10. However, as discussed previously, there are certain disadvantages inherent in this type of apparatus, most notably the necessity of using the counterweight 38 and the heavy materials required for the construction of the elbow member 32 and the conduits 18 and 34.

FIGS. 3, 4, and 5 show an improved side wheel irrigation device according to the present invention, which does not require the use of a counterweight or heavy components. In accordance with the invention, the coupling 32 utilized in the prior art is replaced by a fluid pressure activated mechanism 20, which allows rotation of an improved sprinkler conduit 24 relative to the irrigation conduit 18 while the irrigating device 10 is moved, and prevents such rotation upon the application of irrigating fluid through the device 10.

As shown in FIGS. 5 and 6, the fluid pressure-activated mechanism 20 is connected to an elbow 21 attached to the irrigation conduit 18 and includes a circular housing 22 having a left portion 22a and a right portion 22b. The left portion of the housing 22a is rigidly connected to the elbow 21. The right half of the housing 22b engages one end of the sprinkler conduit 24 in a manner allowing both rotative and axial movement of the conduit 24 relative to the housing 22. The conduit 24 is connected to the housing 22 by means of a hinge pin 26, which allows the conduit 24 to move as described. As seen in FIG. 5, the other end of the sprinkler conduit 24 connects to the sprinkler head 40. In this regard, the conduit 24 utilizes an elbow member 24a at one end to connect to the sprinkler head 40. Accordingly, the conduit 24 has, in cross section, a "U"-shape.

The hinge pin or shaft 26, which has a small diameter relative to that of the conduit 24, is rigidly affixed to the conduit 24 by means of a cavity 25 in the conduit wall. One end of the shaft 26 is either threaded or press-fit into this cavity 25. The other end of the shaft 26 is supported in a cylindrical bearing sleeve 44 within the left housing 22a. The sleeve 44 is attached to the left housing 22a by four flanges 46. This bearing sleeve 44 is constructed of a material having a low coefficient of friction thereby allowing the shaft 26 to easily rotate and axially translate therein. In this manner, the weight of the conduit 24 is distributed over a large inner surface. Furthermore, the outer diameter of the bearing sleeve 44 is only slightly larger than that of the shaft 26 thereby minimizing any effect on the flow of water into the housing and allowing the housing inlet to be made very compactly.

The rotative and translative movement of the shaft 26 is shown in FIGS. 6 and 7. FIG. 6 shows the rotative movement of the shaft 26 as the side wheel roll leveling device is moved into position, while FIG. 7 shows the translative movement of the shaft 26 when the pressure of the fluid within the housing moves the conduit 24 outwardly. This particular arrangement obviates the need for using the outer wall of the conduit as a bearing surface, as typically done in the prior art.

Referring to FIGS. 5, 6, and 8, the left portion of the circular housing 22a has, in cross-section, a T-shaped internal cavity, having a smaller portion 56, forming a fluid inlet adjacent the elbow 21, and a larger portion 54 adjacent the end of the sprinkler conduit 24 within the housing 22. The left portion of the housing 22a has external threads 28 adjacent the smaller cavity 56 for threading engagement with the elbow 21. Similarly, the left portion 22a has internal threads 50 within the larger cavity 54 for threading engagement with the right portion of the housing 22b.

Regarding the right portion of the housing 22b, it similarly has a T-shaped internal cavity with a larger portion 48 and a smaller portion 52, which forms a fluid outlet. The right housing 22b has external threads 42 adjacent the left housing 22a for threading engagement therewith. The right housing 22b has no threads in contacting the sprinkler conduit 24, thereby allowing the rotative and axial movement of the conduit 24 within the internal chamber 48 formed by the assembly of the housings 22a and 22b.

The fluid pressure-activated mechanism within the housing 22 allowing rotative movement of the sprinkler conduit 24 relative to the housing 22 until fluid of sufficient pressure enters the housing includes a rubber washer 64 circumscribing the sprinkler conduit 24 adjacent the outlet 52 and an annular hub member 58 attached to the end of the conduit 24 within the housing 22. The washer 64 prevents fluid from leaking from the housing 22. The washer 64, and the hub 58 also form the braking assembly for the mechanism. The hub 58 is strengthed for the braking operation by a plurality of rectangular cavities 60 adjacent the washer 64.

As shown in from FIGS. 6 and 8, the annular hub member 58 has a slightly smaller diameter than the rubber washer 64. Furthermore, projecting from the annular member 58 adjacent the washer 64 is a sharp raised circular ridge 62. When the fluid pressure on the inlet side of the hub 58 is greater than the atmospheric pressure on the outlet side of the hub 58, the hub 58 and the conduit 24 axially translate within the housing 22 until the raised edge ridge 62 frictionally engages the washer 64. Thus, the degree of axial translation of the hub 58 is controlled by the pressure differential across it. In this regard, and as seen from FIG. 9, the hub 58 is circular and extends completely across the central cavity within the housing. This particular configuration presents a large area for contact with fluid in the housing 22. As a result, fluid of relatively low pressure provides a sufficient differential to move the annular hub 58, and thus the raised ridge 62, into abutting, nonrotating relation with the washer 64, as shown in FIG. 7. The movement of the conduit 24 and hub 58 within the housing 22 is assisted by the low-friction bearing sleeve 44. As described, this sleeve 44 supports the weight of the conduit 24 by virtue of providing a load-bearing surface for one end of the shaft 26, the other end of which is rigidly connected to the conduit 24.

Having thus described the structure of the present invention, its operation can easily be discerned from FIGS. 4, 6 and 7. FIG. 4 shows a diagrammatic view of the rotation of the second extension conduit relative to the housing 22 as the irrigating device is rolled into position. The rotation is possible, because, as shown in FIG. 6, the absence of irrigating fluid of sufficient pressure in the housing 22 allows the raised ridge 62 on the annular hub 58 to be positioned away from the washer 64 and thus the conduit 24 to rotate. As soon as the irrigating device has been properly positioned, and fluid enters the housing 22 such that the pressure differential between the line and atmospheric pressures on opposite sides of the hub 58 favors the line pressure, the annular hub 58, along with the conduit 24 and shaft 26, axially translate until the raised ridge 62 frictionally engages the washer 64, as shown in FIG. 7. Once this has occurred, further rotation of the conduit 24 relative to the housing 22 is prevented. Accordingly, the sprinkler head is maintained in a level position relative to the ground with a simplified design not requiring a counterweight. Additionally, the simplified nature of the design makes it especially adapted for implementation with injection-molded plastic components. Such components are not only relatively easy to fabricate, but they also can be made very lightweight, and are highly resistant to corrosion.

In the foregoing description of the present invention, a preferred embodiment of the invention has been disclosed. It is to be understood that other mechanical and design variations are within the scope of the present invention. Thus, by way of example and not of limitation, the fluid pressure-activated sprinkler head leveling mechanism could be attached to a side wheel irrigating device differently than as described; the sprinkler conduit could be allowed rotative and axial movement by arrangements other than a hinge pin; the housing portion of the mechanism need not necessarily utilize two assembleable halves; the annular hub could be positioned differently on the sprinkler conduit; the washer could be made of different material than rubber, and means other than a raised ridge on the annular hub could be utilized as to engage a washer within the housing. Accordingly, the invention is not limited to the particular arrangement which has been illustrated and described in detail herein.

What is claimed is:

1. In a rollable sidewheel irrigating device of the type having an axle horizontally disposed and attached to two vertically disposed circular supports, an irrigation conduit connected to a source of irrigating fluid and extending perpendicularly from said axle, a gravity-biased sprinkler conduit rotatably connected to said irrigation conduit, and a sprinkler head connected to said sprinkler conduit and biased by the force of gravity to a position perpendicular with the ground, the improvement comprising:

fluid pressure activated means, disposed between said irrigation and sprinkler conduits, for permitting rotative movement of said sprinkler conduit relative to said irrigation conduit as said device is rolled into position prior to the entry of irrigating fluid into said device, and for locking said sprinkler conduit relative to said irrigation conduit for preventing said rotative movement when irrigating fluid of sufficient pressure enters said device, thereby maintaining said perpendicular orientation of said sprinkler head relative to the ground, wherein said fluid pressure activated means comprises:

(a) means for permitting sufficiently free rotative movement of said sprinkler conduit prior to the entry of irrigating fluid to the device such that the force of gravity on the sprinkler conduit and sprinkler head is alone sufficient to maintain said perpendicular orientation of said head, whereby an additional counterweight on the sprinkler conduit or head is not required; and (b) means for locking said sprinkler conduit relative to said irrigation conduit after irrigating fluid enters the device with a locking force sufficiently large such that the locking force by itself resists any forces arising from operation of the sprinkler head tending to rotate the sprinkler conduit relative to the irrigation conduit.

2. An irrigating device as defined in claim 1, wherein said fluid pressure activated means comprises:

a housing having a fluid inlet rigidly affixed to said irrigation conduit and a fluid outlet sealingly communicating with one end of said sprinkler conduit;

means, interconnecting said housing and said sprinkler conduit, for allowing said sprinkler conduit rotative and axial movement within said outlet; and braking means, disposed within said housing, for allowing irrigating fluid of sufficient pressure in said housing to axially translate a second end of said sprinkler conduit into abutting, nonrotating relation with said housing, and for allowing said sprinkler conduit to rotate when said fluid is not of said sufficient pressure, whereby:

(i) as said device is rolled into position for irrigating prior to entry of said irrigating fluid into said housing, said gravitational force is allowed to maintain said sprinkler head in a perpendicular orientation relative to the ground by said rotation of said sprinkler conduit relative to said irrigation conduit, and, (ii) upon application of said fluid to said device, after said device has been properly positioned, said sprinkler head is prevented from rotating and is maintained in said perpendicular position by said braking means.

3. An irrigating device as defined in claim 2, wherein said sprinkler conduit comprises a U-shaped conduit member connected at one end to said housing, said U-shape allowing said gravitational force to bias said conduit and thus said sprinkler head to said perpendicular relation with said ground as said device is positioned.

4. An irrigating device as defined in claim 2, wherein said braking means comprises:

washer means, disposed within said housing adjacent said outlet and circumscribing said end of said sprinkler conduit, for preventing fluid loss between said housing and said sprinkler conduit; and hub means, attached to the end of said sprinkler conduit within said housing, for allowing fluid of sufficient pressure in said housing to axially translate said sprinkler conduit until said hub means engages said washer means, whereupon said rotation of said sprinkler conduit relative to said housing is prevented.

5. An irrigating device as defined in claim 4, wherein:

said inlet and said outlet of said housing are generally cylindrical in shape;

said washer means comprises an annular washer of rubber material; and said hub means comprises a solid annular member attached to said end of said sprinkler conduit within said housing, said annular member including a sharp, raised ridge disposed toward said washer, whereby, when the pressure of said irrigating fluid on the housing inlet side of said hub means is greater than the atmospheric pressure on the housing outlet side of said hub means, said hub means and said sprinkler conduit axially translate until said ridge frictionally engages said washer, said engagement stopping further axial translation of said second extension conduit and preventing said rotative movement of said sprinkler conduit.

6. An irrigating device as defined in claim 4, wherein said housing comprises:

a first member having two internal, communicating cavities of different diameters, with the cavity of smaller diameter defining said inlet, and with the cavity of larger diameter communicating with said sprinkler conduit, said first member being externally threaded adjacent said cavity of smaller diameter for engagement with said irrigation conduit, and said first member being internally threaded adjacent said cavity of larger diameter; and a second member having two internal, communicating cavities of different diameters, with the cavity of smaller diameter defining said outlet, and with the cavity of larger diameter communicating with said sprinkler conduit, said second member being externally threaded adjacent said cavity of larger diameter for threading engagement with said internal threads of said first member.

7. An irrigating device as defined in claim 2, wherein said means for allowing rotative and axial movement of said sprinkler conduit comprises:

shaft means, projecting axially into said fluid inlet from the end of said conduit within said housing, for transferring the weight of said conduit to said housing, said shaft means being rigidly connected to and having a smaller diameter than said conduit;

bearing sleeve means, having a slightly larger diameter than said shaft means and disposed axially within said inlet, for providing a load-bearing surface for the end of said shaft projecting into said inlet, said bearing sleeve utilizing material with a low coefficient of friction, whereby said shaft means may freely rotate and axially translate within said bearing sleeve means as said conduit moves within said housing.

8. An irrigating device as defined in claim 1, wherein said fluid pressure activated means is constructed of plastic material.

9. A rotable, fluid coupling incorporating pressure activated braking means, comprising:

a housing having a fluid inlet and a fluid outlet, said inlet being connected to a source of irrigating fluid;

fluid conduit means, having one end sealingly disposed in said outlet for rotative and axial movement therein, for receiving fluid from said inlet; and braking means for allowing fluid of sufficient pressure in said housing to axially translate said end of said conduit means into abutting, nonrotating relation with said housing, and for allowing said conduit means to rotate when said fluid is not of sufficient pressure, wherein said braking means comprises:

(a) an annular washer, disposed within said housing adjacent said outlet and circumscribing said end of said conduit means, for preventing fluid loss between said housing and said conduit means; and (b) an annular member attached to the end of said conduit means within said housing, said annular member including a sharp, raised ridge disposed toward said washer, whereby when the pressure of said irrigating fluid on the housing inlet side of said annular member is greater than the atmospheric pressure on the housing outlet side of said annular member, said annular member and said conduit means axially translate until said ridge frictionally engages said washer, said engagement stopping further axial movement of said conduit means and preventing said rotative movement of said conduit means.

10. A fluid coupling as defined in claim 9, wherein said coupling further comprises:
shaft means, projecting axially into said fluid inlet from the end of said conduit means within said housing, for transferring the weight of said conduit means to said housing, said shaft means being rigidly connected to and having a smaller diameter than said conduit means;
bearing sleeve means, having a slightly larger diameter than said shaft means and disposed axially within said inlet, for providing a load-bearing surface for the end of said shaft projecting into said inlet, said bearing sleeve utilizing material with a low co-efficient of friction, whereby said shaft means may freely rotate and axially translate within said bearing sleeve means as said conduit moves within said housing.

11. A fluid coupling as defined in claim 9, wherein said housing comprises:
a first member having two internal, communicating cavities of different diameters, with the cavity of smaller diameter defining said inlet and with the cavity of larger diameter communicating with said end of said conduit means, said first member being externally threaded adjacent said cavity of smaller diameter for connection to a source of fluid, and said first member being internally threaded adjacent said cavity of larger diameter; and
a second member having two internal, communicating cavities of different diameters, with the cavity of smaller diameter defining said outlet, and with the cavity of larger diameter communicating with said conduit means, said second member being externally threaded adjacent said cavity of larger diameter for threading engagement with said internal threads of said first member.

12. A fluid coupling as defined in claim 9, wherein:
said housing is adapted to be rigidly affixed at said inlet to a rollable source of fluid; and
said conduit means comprises an U-shaped gravity-biased cylindrical member adapted to connect to an irrigating sprinkler head, whereby,
(i) as said fluid source is rolled prior to said fluid passing into said housing, the force of gravity causes said U-shaped conduit means to rotate and thereby maintain said sprinkler head in a perpendicular orientation relative to the ground; and
(ii) upon application of said fluid to said housing, said braking means prevents said conduct means from rotating and thus maintains said sprinkler head in said perpendicular position.

13. A fluid coupling as defined in claim 9, wherein:
said fluid coupling is constructed of components made of plastic material.

* * * * *